(12) United States Patent
Hayashi et al.

(10) Patent No.: US 6,261,712 B1
(45) Date of Patent: Jul. 17, 2001

(54) METHOD OF RECLAIMING CATHODIC ACTIVE MATERIAL OF LITHIUM ION SECONDARY BATTERY

(75) Inventors: Masaru Hayashi; Fuminobu Tezuka, both of Kanagawa; Yuki Tomioka, Saitama; Kunihiko Sasaki; Tetsuya Tachibe, both of Kanagawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/338,433

(22) Filed: Jun. 23, 1999

(30) Foreign Application Priority Data

Jun. 30, 1998 (JP) .................................................. 10-184911

(51) Int. Cl.$^7$ ............................ H01M 10/42; H01M 6/50
(52) U.S. Cl. .................. 429/49; 429/231.95; 429/231.1; 429/231.3; 429/231.2; 423/179.5; 423/441; 423/50
(58) Field of Search ................................. 429/49, 231.95, 429/231.1, 231.3, 231.2; 423/179.5, 441, 50

(56) References Cited

U.S. PATENT DOCUMENTS 5,352,270 * 10/1994 Shackle .................................. 75/419
5,882,811 * 3/1999 Kawakami ............................. 429/49
5,888,463 * 3/1999 McLaughlin et al. ............. 423/179.5
6,120,927 * 9/2000 Hayashi et al. ....................... 429/49

FOREIGN PATENT DOCUMENTS 6-251805  9/1994 (JP) .
6-322452  11/1994 (JP) .

* cited by examiner

Primary Examiner—Stephen Kalafut
Assistant Examiner—Angela J. Martin
(74) Attorney, Agent, or Firm—Oblon, Spivak, McClelland, Maier & Neustadt, P.C.

(57) ABSTRACT

Disclosed is a method of reclaiming a cathodic active material of lithium ion secondary batteries. The lithium ion secondary battery is broken and the casing and the content are separated to remove the casing from the content. The content is dissolved into a mineral acid to separate remaining non-dissolved content from the mineral acid to obtain a liquid containing the cathodic active material represented by the formula: $LiMO_2$, where M is a transition metal element: cobalt, nickel and manganese. A lithium salt is added to the liquid, and the cathodic active material is recovered from the liquid in the form of a mixture of lithium compound and the transition metal compound, which is calcined and reclaimed into the cathodic active material.

26 Claims, No Drawings

METHOD OF RECLAIMING CATHODIC ACTIVE MATERIAL OF LITHIUM ION SECONDARY BATTERY

BACKGROUND OF THE INVENTION

1. Field of the Invention

The present invention relates to a method of reclaiming a cathodic active material of a lithium ion secondary battery which is used as a power source for various electronics such as videotape recorders and communication tools.

2. Related Art

Nonaqueous electrolytic batteries attract considerable attention as the battery with a high energy density and have come to be widely used as the power source for electronics along with the recent progress of a variety of down-sized and light-weight electronics such as videotape recorders, communication tools and the like. Among these nonaqueous electrolytic batteries, lithium ion secondary batteries, unlike other secondary batteries, do not contain the metal components of which use must be carefully considered from the standpoint of environmental problems, such as mercury, cadmium and lead, and are also characterized by having a sufficient cycle life. Hence the usage of the lithium ion secondary batteries is steadily increasing. As for materials used for the lithium ion secondary batteries, both of materials currently used and materials proposed for the next generation contain rare metals such as cobalt and the like, which are specified as the national stock material. Hence public attention is focused on the recovery of rare metals from used lithium ion secondary batteries to reuse these metals.

In the above-described circumstances, it has been activated in view of conservation of natural resources, to develop the technology for recycling lithium ion secondary batteries, and the target for reclamation is on the metal compounds used as a cathodic active material such as cobalt compounds, lithium compounds, nickel compounds, manganese compounds and the like.

For example, there is a proposed process for recovering cobalt hydroxide, in which the batteries are calcined and crushed, the crushed batteries are screened after iron is removed from the crushed batteries by means of magnetic separation, the minus sieve of the crushed batteries are dissolved in an acid, and solvent extraction is made on the acid solution, thereby obtaining cobalt hydroxide. This process can yield cobalt hydroxide of a relatively high purity as a recovery product.

In the above process, however, an expensive organic agent is used for precipitation and much electric power is also necessary for recovering lithium by electrolysis which is performed separately from the recovery of cobalt. Therefore, this process has a problem in running cost. Moreover, if the recovered materials, cobalt and lithium, are used in preparation of the cathode of batteries, they must be further refined before blending them to make a starting material for production of the carhodic active material. Therefore, it costs much to apply the above recovery process to reclamation and recycle of the active material.

As clearly understood from the above description, the conventional process for recovering cobalt from lithium ion secondary batteries costs much because of the use of expensive organic agent and has a disadvantage that the metal elements from which the cathodic active material is composed, or lithium and cobalt, are separately recovered and an active material such as can be reused is not directly obtained.

SUMMARY OF THE INVENTION

With these problems in mind, therefore, it is the primary object of the present invention to provide a novel method of reclaiming a cathodic active material from a lithium ion secondary battery, that is, a reclamation method which enables to directly recover the cathodic active material such as bears reusing.

In order to achive the above-mentioned object, a method of reclaiming a cathodic active material from a lithium ion secondary battery having a casing and a content including a cathodic active material, according to the present invention, comprises the steps of: breaking the lithium ion secondary battery and separating the casing and the content to remove the casing from the content; dissolving the content into a mineral acid to separate remaining non-dissolved content from the mineral acid to obtain a liquid containing the cathodic active material; adding a lithium salt to the liquid; and recovering the cathodic active material from the liquid.

In another aspect of the present invention, a method of reclaiming a cathodic active material of a lithium ion secondary battery, wherein the cathodic active material comprises a lithium compound represented by the formula: $LiMO_2$, where the letter M represents a transion metal element selected from the group consisting of cobalt, nickel and manganese, the method comprises the steps of: preparing a liquid in which the cathodic active material is dissolved; adding a small amount of a lithium salt into the prepared liquid; producing a precipitate containing lithium element and the transition metal element of the cathodic active material from the prepared liquid; and separating and calcining the precipitate to reclaim a cathodic active material.

The features and advantages of the recovering method according to the present invention over the proposed recovering process will be more clearly understood from the following description of the preferred embodiments of the present invention.

DETAILED DESCRIPTION OF THE PREFERRED EMBODIMENTS

Batteries, including galvanic cells and battery packs, have, in general, positive and negative electrodes, an electrolyte and a casing for covering these parts. Each of the electrodes comprises a collector which is a main body of the electrode and a layer of an anodic or cathodic active material which is formed on the surface of the collector. The anodic and cathodic active materials are respectively laminated as a film on the surface of each of the collectors by using a binder such as a PVdF, and they work for an exchange of electrons and ions on the surface of the collector. These active materials also serve to protect the surface of the collector. In the lithium ion secondary battery, the cathodic collector is commonly formed of aluminum and the anodic collector is formed of copper. As the anoodic active material, carbon or the like is used, and as the cathodic active material, lithium cobaltate ($LiCoO_2$), lithium nickelate ($LiNiO_2$) and the like are commonly used.

The layer of cathodic active material is formed using a powder of cathodic active material which is typically represented by a formula: $LiMO_2$, wherein the letter M is a transition metal element selected from the group consisting of Co, Ni and Mn. Powdered lithium cobaltate ($LiCoO_2$) as an active material can be obtained by calcining a mixture of a powder of a lithium compound and a powder of a cobalt compound to produce lithium cobaltate. The lithium compound and the cobalt compound are, respectively, such a compound as can produce a corresponding oxide by calcination thereof, for instance, oxide, hydroxide, carbonate, carbide and the like, of each of lithium and cobalt. Specific examples of the lithium compound include $Li_2O$, $Li_2CO_3$ and the like, and those of the cobalt compound include $Co(OH)_2$, $Co_2(CO_3)(OH)_2$, $Co_2O_3$ and the like. Here, it should be noted that the mixing ratio of the lithium compound and the cobalt compound is commonly regulated so that the content of lithium is slightly in excess of its stoichiometric amount. The excess amount of lithium compound remains in the calcined product, which is possibly removed by washing the calcined product with cleaning water. In a case of the cathodic active material being lithium nickelate, it is similarly obtained by calcining a mixture of a powder of a lithium compound and a powder of a nickel compound to produce lithium nickelate. Examples of the nickel compound include $Ni(OH)_2$, $Ni_2(CO_3)(OH)_2$, $Ni_2O_3$ and the like.

In the present invention, the cathodic active material of the used batteries is reclaimed by preparing a liquid dissolving the cathodic active material, recovering the cathodic active material in the form of a mixture of the lithium compound and the cobalt compound or the nickel compound or the like as described above, and then reclaiming the recovered mixture into the cathodic active material by calcining it.

Now, the reclaiming method according to the present invention will be described below in detail, in reference to an embodiment for reclaiming rithium cobaltate as the cathodic active material.

In advance, the lithium ion secondary batteries are broken into small pieces, and iron pieces, which are from the casing of the batteries, are first removed from the broken pieces of batteries by means of, for example, magnetic separation or the like. Alternatively, iron pieces are possibly removed by using acid liquid to dissolving only the iron pieces therein.

The broken pieces after removal of iron pieces are poured into an acidic liquid to dissolve the metal components of the cathodic active material into the acidic liquid, and the residue containing non-metalic components such as carbon and the like is removed from the acidic liquid by filtration or other separation measure, thereby preparing a solution containing those metal components. The acidic liquid used for dissolving the metal components is not strictly limited and any aqueous solution of an acid capable of dissolving metals may be used. For example, an aqueous solution of a mineral acid such as hydrochloric acid, sulfuric acid, nitric acid and the like can be suitably used as the acidic liquid. However, it is desired for easy reclamation to avoid other metalic components than those of the cathodic active material from being contained in the acidic liquid. In view of this, it is preferred to use sulfuric acid, in particular, a dilute aqueous solution of sulfuric acid as the acidic liquid, because the anode collector made of copper and the cathode collector made of aluminum are rather difficult to dissolve therein and it is therefore easy to reclaim a cathodic active material of high purity. Use of hydrochloric acid or nitric acid is also preferable, because these acid matters are avairable at low prices and the reclaimed cathodic active material possibly has a relatively high purity.

Before reclamation of the cathodic active material from the acidic liquid dissolving the metal components of the cathodic active material, it is preferred that metal impurities or other metals than cobalt and lithium are removed from the acidic liquid, in order to accomplish reclamation with a high purity of the cathodic active material. This can be realized by means of pH value control and electrolysis, specifically, neutralide precipitation and electrolytic deposition.

In detail, the acidic liquid is almost neutralized with alkali material to adjust the pH value to the range of about 6 to 8, preferably about 6 to 7, and most preferably about 6.5, whereby the ions of metals such as iron, chromium, aluminum and the like are transformed to their metal hydroxides which are precipitated. Therefore, they are possibly removed from the solution by filtration or the like. As the alkali material preferable to use is an aqueous solution of alkali metal hydroxide such as sodium hydroxide, potassium hydroxide and the like.

Of the remaining metals which are not precipitated by the above-described neutralization of the acidic liquid, copper and the like are removed by electrolysis from the above neutralized liquid. These metals are deposited on the electrode by the electrolysis.

The neutralization and electrolysis described above are carried out for preparing a liquid which contains the metal components of the cathodic active material, i,e, lithium and cobalt at high purities so as to possibly reclaim therefrom the cathodic active material having a high purity. It is therefore important at the above neutralization and electrolysis step to remove most parts of impurities or metal elements other than the components of the cathodic active material in order to reclaim the cathodic active material of a high purity at low cost through the subsequent steps.

The liquid after the neutralization and the electrolysis is then concentrated, specifically by heating the liquid and evaporating the solvent, until the liquid is saturated with the mineral acid salt and the mineral acid salt begins to precipitate. This treatment is carried out for the sake of facilitating precipitation of lithium carbonate from the liquid at the later step. In detail, since lithium carbonate is not precipitated from its dilute solution, it is necessary to concentrate the liquid as high as possible, namely, up to the level that the salt of the mineral acid and the metal component of the cathodic active material may begin to precipitate.

From the concentrated liquid, cobalt and lithium are recovered in the form of a precipitate containing cobalt and lithium, which is to be calcined to produce lithium cobaltate. Here, it is to be noted that the following points are important in performing this recovering.

1) The content of lithium in the concentrated liquid must be slightly raised to a level such that the precipitate to be obtained therefrom possibly contain lithium in excess of the stoichiometric amount for producing lithium cobaltate, lithium nickelate, etc.

2) It is preferred to supply carbonate ion to the liquid to facilitate precipitation of lithium and the transition metal (Co, Ni, Mn) of the cathodic active material.

According to the above point (1), lithium salt such as lithium carbonate, lithium hydroxide and the like is added to the concentrated liquid. The amount of the lithium salt added to the concentrated liquid is determined to such an amount that, when lithium and cobalt are recovered from the concentrated liquid at the later step, the amount of recovered lithium is in excess of the amount equimolar to the recovered cobalt in the same extent as that is required for the mixture of the lithium compound and the cobalt compound which is prepared and calcined for the production of the cathodic active material or the lithium cobaltate as described above. For this lithium salt to be added, it is a suitable scheme to use the cleaning water which is recovered after washing the calcined lithium cobaltate product in the preparation of the cathodic active material and which contains the excessive lithium compound removed from the calcined lithium cobaltate product. Addition of lithium salt at this step also serves to promote precipitation of lithium salt at the later step.

Moreover, according to the point (2), a basic carbonate compound such as sodium carbonate, lithium carbonate, potasium carbonate and the like is added to the above liquid in order to supply carbonate ion to the liquid. In this step, the pH value is adjusted to about 10 or more, thereby most part of cobalt is precipitated in the form of cobalt hydroxide carbonate, $Co(OH)(CO_3)$, and lithium is precipitated in the form of lithium carbonate, $Li_2CO_3$. If the pH value of the liquid is further raised to about 12 or more by addition of alkaline material such as alkali metal hydroxide and the like, the remaining small amount of cobalt is almost precipitated in the form of cobalt trihydroxide, $Co(OH)_3$.

It is preferred, before separating the precipitate from the liquid, to add a small amount of water to the liquid for facilitating dissolution into the liquid of alkali metal such as sodium adhering to the precipitate, and to digeste the liquid for completing precipitation of lithium at an increased temperature.

The above precipitate containing cobalt hydroxide carbonate, lithium carbonate and cobalt trihydroxide is then separated from the liquid by filtration or other separation measures. The molar content of lithium in the separated precipitate containing cobalt hydroxide carbonate, cobalt trihydroxide and lithium carbonate is slightly higher than that of cobalt. The separated precipitate is then calcined at a temperature of about 500° C. or more, preferably about 800 to 1,000° C., in an oxidizing atmosphere, preferably for about 3 to 6 hours to obtain lithium cobaltate, $LiCoO_2$, containing a small amount of lithium compound which has not reacted at the calcination for production. This product is pulverized and washed with water, preferably digested with warm water, to remove the remaining lithium compound, thereby a clean powder of lithium cobaltate is reclaimed. If necessary, this lithium cobaltate powder is further washed with alcohol in order to remove water and facilitate drying of the powder. The lithium cobaltate powder reclaimed above can be suitably used as the cathodic active material. The washing water containing the excessive lithium element may be used again in the reclaiming procedures described above.

EXAMPLES

The present invention will be hereinafter explained by way of examples.

Example 1

First of all, used lithium ion secondary batteries using lithium cobaltate ($LiCoO_2$) as the cathodic active material were thoroughly dipped In water which was received in a transparent container made of acrylic resin and they were discharged to reduce the remaining electromotive force to final voltage of 0.18 V or less before they were taken out of the water. The batteries were broken into pieces of 10 mm square by a crusher and pieces of the battery casings made of iron were removed therefrom by means of a magnetic separator.

Next, 1 kg of the remaining pieces of the batteries were poured into a glass beaker and mixed with 1500 ml of a mixed acid liquid of 1 N sulfuric acid and 0.6 M hydrogen peroxide. The beaker was heated for eight hours by a heater so that the cathodic active material were decomposed and dissolved into the mixed acid liquid. The mixed acid liquid was then filtered to remove the non-dissolved pieces, and the pH value of the filtrate was regulate to about 6.5 by addition of 5% sodium hydroxide aqueous solution. As a result, impurities such as iron, chromium and aluminum were precipitated in the forms of hydroxide. The precipitate was filtered with a filter paper and washed well by pure water, and the filtrate was received with the cleaning water in a beaker. With a pair of electrodes, the filtrate in the beaker was electrolyzed at a current of 1 A for five hours, thereby copper contained in the filtrate as an impurity was deposited on the negative electrode. The liquid after the removal of copper was heated by a hot plate to evaporate the water medium and it was concentrated until cobalt sulfate started to precipitate in it.

The concentrated liquid was left to stand for cooling and a powder of lithium carbonate was added to the cooled liquid to adjust the pH value to 7.0, thereby not only the liquid was neutralized but also the concentration of lithium was raised. Moreover, a powder of sodium carbonate was added to the liquid until the pH value is raised to 10.0. At this time, the most of cobalt in the liquid was precipitated in the form of cobalt hydroxide carbonate, and lithium was precipicated in the form of lithium carbonate. In addition, 10% sodium hydroxide aqueous solution was added to the liquid until the pH value of the liquid increased to 12.0, thereby the cobalt ion remaining in the liquid changed to cobalt hydroxide to precipitate. The precipitate was separated from the liquid by filtration with filter paper. The precipitate was poured into a glass beaker which was heated on a hot plate to absolutely dry the precipitate, followed by leaving the precipitate to stand for cooling. Then the precipitate was transferred to an aluminum boat and put into an electric furnace in which an oxygen atmosphere adjusted to 900° C., where the precipitate was calcined for five hours. After cooling, the calcined product was transferred to an agate mortar and pulverized into a powdery solid which was pourd into a beaker. Pure water was added to the powdery solid and stired by a magnetic stirrer for twenty minutes so as to dissolve non-reacted lithium salt contained in the powdery solid into the water. The powdery solid was separated from the water by filtration with filter paper and washed by another portion of pure water and further by methanol for removing the water from the powdery solid.

The yield of the powdery solid obtained above was 290 g, and composition of the powdery solid was analyzed by using inductively coupled argon plasma emission spectrometory. The result of the analysis is shown in Table 1.

TABLE 1

| Example 1 | Reclaimed Powdery Solid | Lithium Cobaltate on the Market |
|---|---|---|
| | Composition (% by mass) | |
| $Li_2O$ | 16.49 | 16.81 |
| $CO_2O_3$ | 81.76 | 80.78 |
| | Impurities (% by mass) | |
| Al | 0.030 | 0.005 |
| Cu | 0.005 | 0.002 |
| Fe | 0.018 | 0.021 |
| Cr | 0.002 | 0.001 |
| Mn | 0.003 | 0.001 |
| Ca | 0.014 | 0.013 |
| Mg | 0.006 | 0.004 |
| Ni | 0.08 | 0.05 |

As shown in Table 1, the powdery powder reclaimed in Example 1 had almost the same composition as that of the lithium cobaltate commonly sold on the market as a cathodic active material, as well as the same levels of impurity contents.

Example 2

The operation of Example 1 was repeated, excepting that, instead of the mixed acid liquid of 1 N sulfuric acid and 0.6 M hydrogen peroxide, 1500 ml of a mixed acid liquid of 1 N nitric acid and 0.6 M hydrogen peroxide was used for dissolving the cathodic active material of the used batteries. As a result, 275 g of powdery solid of lithium cobaltate was reclaimed as the cathodic active material. The composition and impurity contents were measured in the same manner. The result of measurement is shown in Table 2.

TABLE 2

| Example 2 | Reclaimed Powdery Solid | Lithium Cobaltate on the Market |
|---|---|---|
| | Composition (% by mass) | |
| $Li_2O$ | 16.45 | 16.81 |
| $Co_2O_3$ | 81.46 | 80.78 |
| | Impurities (% by mass) | |
| Al | 0.005 | 0.005 |
| Cu | 0.13 | 0.002 |
| Fe | 0.019 | 0.021 |
| Cr | 0.004 | 0.001 |
| Mn | 0.004 | 0.001 |
| Ca | 0.021 | 0.013 |
| Mg | 0.010 | 0.004 |
| Ni | 0.10 | 0.05 |

For the powdery solid reclaimed in Example 2, though copper was detected about 25 times more than that in Example 1, the content of aluminum impurity was slightly less than that of Example 1. This means that nitric acid is enough for the eluent to use for reclamation of the cathodic active material of lithium ion secondary batteries, though the purity of cathodic active material reclaimed with use of nitric acid is somewhat reduced.

Example 3

The operation of Example 1 was repeated, excepting that, instead of the mixed acid liquid of 1 N sulfuric acid and 0.6 M hydrogen peroxide, 1500 ml of a mixed acid liquid of 1 N hydrochloric acid and 0.6 M hydrogen peroxide was used for dissolving the cathodic active material of the used batteries. As a result, 240 g of powdery solid of lithium cobaltate was reclaimed as the cathodic active material. The composition and impurity contents were measured in the same manner. The result of measurement is shown in Table 3.

TABLE 3

| Example 3 | Reclaimed Powdery Solid | Lithium Cobaltate on the Market |
|---|---|---|
| | Composition (% by mass) | |
| $Li_2O$ | 16.47 | 16.81 |
| $CO_2O_3$ | 81.51 | 80.78 |
| | Impurities (% by mass) | |
| Al | 0.58 | 0.005 |
| Cu | 0.008 | 0.002 |
| Fe | 0.013 | 0.021 |
| Cr | 0.006 | 0.001 |
| Mn | 0.005 | 0.001 |
| Ca | 0.020 | 0.013 |
| Mg | 0.009 | 0.004 |
| Ni | 0.11 | 0.05 |

For the powdery solid reclaimed in Example 3, aluminum was detected about 20 times more than that in Example 1. Though the purity of cathodic active material reclaimed with use of hydrochloric acid somewhat falls, hydrochloric acid is enough to use for reclamation of the cathodic active material of lihtium ion secondary batteries.

Example 4

The operation of Example 1 was repeated, excepting that, instead of the batteries using lithium cobaltate as the cathodic active material, used lithium ion secondary batteries using lithium nickelate as the cathodic active material was used to reclaim lithium nickelate as the cathodic active material. As a result, 285 g of powdery solid of lithium nicklate was reclaimed as the cathodic active material. The composition and impurity contents were measured in the same manner. The result of measurement is shown in Table 4.

TABLE 4

| Example 4 | Reclaimed Powdery Solid | Lithium Nickelate on the Market |
|---|---|---|
| | Composition (% by mass) | |
| $Li_2O$ | 16.55 | 16.74 |
| $Ni_2O_3$ | 82.13 | 80.68 |
| | Impurities (% by mass) | |
| Al | 0.024 | 0.005 |
| Cu | 0.006 | 0.003 |
| Fe | 0.014 | 0.025 |
| Cr | 0.006 | 0.002 |
| Mn | 0.003 | 0.001 |
| Ca | 0.013 | 0.014 |
| Mg | 0.005 | 0.004 |
| Co | 0.08 | 0.05 |

As shown in the above, even if the cathodic active material is rithium nickelate, it is possible to recover a reclaimed product having a composition and impurity contents that are almost on the same levels as those in the case of rithium cobaltate. It can be recognized from the results of Example 4 that other cathodic active materials than lithium cobaltate are possibly reclaimed with a high recovery and a prominent quality by the reclamation process according to the present invention.

It must be understood that the invention is in no way limited to the above embodiments and that many changes may be brought about therein without departing from the scope of the invention as defined by the appended claims.

What is claimed is:

1. A method of reclaiming a cathodic active material of a lithium ion secondary battery having a casing and a content, said content comprising a cathodic active material represented by the formula $LiMO_2$, wherein M is a transition metal, comprising the steps of:

breaking the lithium ion secondary battery and separating the casing and the content to remove the casing from the content;

dissolving the content into a mineral acid to separate a remaining non-dissolved content from the mineral acid, thereby obtaining a liquid comprising the cathodic active material;

adding a lithium salt to the liquid; and recovering the cathodic active material from the liquid by producing a precipitate comprising lithium and the transition metal of the cathodic active material from the liquid; and separating and calcining the precipitate to reclaim a cathodic active material.

2. The reclaiming method of claim 1, wherein the transition metal is elected from the group consisting of cobalt, nickel and manganese.

3. The reclaiming method of claim 1, further comprising the steps of:

removing, from the liquid obtained at the dissolving step, a metallic impurity other than lithium and the transition metal of the cathodic active material.

4. The method of claim 3, wherein the removing step comprises:

precipitating or depositing the metallic impurity by pH control or electrolyzation of the prepared liquid.

5. The method of claim 4, wherein the precipitating or depositing step comprises:

adjusting the pH value of the liquid to approximately 6 to 8.

6. The method of claim 1, wherein, in the precipitate, the amount of lithium is in excess of the amount equimolar to the amount of transition metal of the cathodic active material.

7. The method of claim 1, wherein the producing step comprises:

alkalizing the liquid with an alkaline material comprising a carbonate compound.

8. The method of claim 1, wherein the producing step comprises the step of:

concentrating the liquid before the adding step.

9. The method of claim 7, wherein the lithium salt added at the adding step is selected from the group consisting of lithium hydroxide and lithium carbonate, the carbonate compound of the alkalizing step is selected from the group consisting of sodium carbonate, lithium carbonate and potassium carbonate, and the pH value of the prepared liquid at the alkalizing step is adjusted to approximately 10 or more.

10. The method of claim 7, wherein the pH value of the prepared liquid at the alkalizing step is adjusted to approximately 12 or more.

11. The method of claim 1, wherein the precipitate produced at the producing step comprises cobalt hydroxide carbonate: $Co(OH)(CO_2)$, and lithium carbonate: $Li_2CO_3$.

12. The method of claim 1, wherein the recovering step further comprises, before the separating step, the steps of:

adding water to the liquid; and digesting the liquid.

13. The method of claim 1, further comprising the step of:

cleaning the reclaimed cathodic active material with water to remove excess lithium.

14. The anodic active material reclaimed by the method of claim 1.

15. A method of reclaiming a cathodic active material of a lithium ion secondary battery, wherein the cathodic active material comprises a lithium compound represented by the formula $LiMO_2$, where the letter M represents a transition metal selected from the group consisting of cobalt, nickel and manganese, the method comprising the steps of:

preparing a liquid in which the cathodic active material is dissolved;

adding a lithium salt into the prepared liquid;

producing a precipitate comprising lithium and the transition metal of the cathodic active material from the prepared liquid; and separating and calcining the precipitate to reclaim a cathodic active material.

16. The method of claim 15, wherein the liquid prepared at the preparing step comprises a solution that the anodic active material is dissolved in an acidic liquid which includes mineral acid, and the producing step comprises:

alkalizing the prepared liquid with an alkaline material containing a carbonate compound, thereby the produced precipitate contains cobalt hydroxide carbonate: $Co(OH)(CO_3)$, and lithium carbonate: $Li_2CO_3$.

17. The method of claim 16, wherein the mineral acid comprises sulfuric acid, and the method further comprises the step of:

removing, from the prepared liquid, a metallic impurity other than lithium and the transition metal of the anodic active material, and the removing step comprises:

precipitating or depositing the metallic impurity by pH control or electrolyzation of the prepared liquid.

18. The method of claim 15, wherein, in the precipitate produced at the producing step, the amount of lithium is in excess of the amount that is equimolar to the amount of the transition metal of the cathodic active material, and the method further comprises the step of:

cleaning the reclaimed cathodic active material with water to remove excess lithium.

19. The method of claim 17, wherein the precipitating or depositing step comprises:

adjusting the pH value of the liquid to approximately 6.5.

20. The anodic active material reclaimed by the method of claim 15.

21. A method of reclaiming a cathodic active material of a lithium ion secondary battery, wherein the cathodic active material comprises a lithium compound represented by the formula $LiMO_2$, where the letter M represents a transition metal selected from the group consisting of cobalt, nickel and manganese, the method comprising the steps of:

preparing a liquid in which the cathodic active material is dissolved;

adding a lithium salt into the prepared liquid;

producing, from the prepared liquid, a precipitate containing lithium and the transition metal of the cathodic active material such that the amount of lithium is in excess of the amount that is equimolar to the amount of the transition metal of the cathodic active material; and separating and calcining the precipitate to reclaim a cathodic active material.

22. The reclaiming method of claim 1, wherein the mineral acid comprises sulfuric acid.

23. The reclaiming method of claim 7, wherein the carbonate compound of the alkalizing step is selected from the group consisting of sodium carbonate, lithium carbonate and potassium carbonate.

24. The reclaiming method of claim 7, wherein a pH value of the liquid in the alkalizing step is adjusted to 10 or more.

25. The reclaiming method of claim 7, wherein the pH value of the prepared liquid in the alkalizing step is adjusted to 12 or more.

26. The reclaiming method of claim 17, wherein the precipitating or depositing step comprises adjusting the pH value of the liquid to 6.5.

* * * * *